(12) United States Patent
Aoki

(10) Patent No.: US 11,401,877 B2
(45) Date of Patent: Aug. 2, 2022

(54) CONTROL SYSTEM OF AIR-FUEL RATIO SENSOR

(71) Applicant: TOYOTA JIDOSHA KABUSHIKI KAISHA, Aichi-ken (JP)

(72) Inventor: Keiichiro Aoki, Shizuoka-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/355,195

(22) Filed: Jun. 23, 2021

(65) Prior Publication Data

US 2021/0404400 A1 Dec. 30, 2021

(30) Foreign Application Priority Data

Jun. 26, 2020 (JP) .............................. JP2020-110708

(51) Int. Cl.
*F02D 41/14* (2006.01)

(52) U.S. Cl.
CPC ..... *F02D 41/1494* (2013.01); *F02D 41/1454* (2013.01)

(58) Field of Classification Search
CPC .......................... F02D 41/1454; F02D 41/1494
USPC ........................................................ 123/697
See application file for complete search history.

(56) References Cited

U.S. PATENT DOCUMENTS

| | | | |
|---|---|---|---|
| 9,803,577 B2* | 10/2017 | Ide | F02D 41/401 |
| 10,281,446 B2* | 5/2019 | Hagiwara | H05B 1/0244 |
| 11,092,102 B2* | 8/2021 | Aoki | F02D 41/1494 |
| 2013/0006499 A1* | 1/2013 | Date | F02N 11/0814 |
| | | | 701/112 |
| 2013/0180853 A1* | 7/2013 | Mori | G01N 27/409 |
| | | | 204/406 |
| 2021/0239061 A1* | 8/2021 | Sano | F02D 41/1494 |

FOREIGN PATENT DOCUMENTS

JP 2003148206 A 5/2003

* cited by examiner

*Primary Examiner* — Erick R Solis
(74) *Attorney, Agent, or Firm* — Hauptman Ham, LLP

(57) ABSTRACT

A control device selectively executes first and second energization control for controlling an energization amount to the heater. The first energization control is executed to keep temperature of a sensor element within an active temperature region. The first energization control is PWM control in which the energization amount is controlled with closed loop control such that an impedance of the sensor element matches a target value. The second energization control is PWM control in which the energization amount is controlled with open loop control so as to keep the temperature of the sensor element within a preset temperature region that is lower than the active temperature region. The control device executes the second energization control during an internal combustion engine is stopped while executing the first energization control during the internal combustion engine is not stopped.

3 Claims, 9 Drawing Sheets

CONTROL SYSTEM OF AIR-FUEL RATIO SENSOR

CROSS-REFERENCE TO RELATED APPLICATION

The present application claims priority under 35 U.S.C. § 119 to Japanese Patent Application No. 2020-110708, filed Jun. 26, 2020, the contents of which application are incorporated herein by reference in their entirety.

TECHNICAL FIELD

The present disclosure relates to a control system of an air-fuel ratio sensor for detecting air-fuel ratio of exhausts from an internal combustion engine (hereinafter also referred to simply as an "engine").

BACKGROUND

JP2003-148206A discloses a control system of an air-fuel ratio sensor. In this conventional system, feedback control is executed in which an energization amount of the heater for heating the sensor element is calculated such that temperature of the sensor element of the air-fuel ratio sensor matches a target temperature. This feedback control is executed not only while the engine is operated but also executed while the engine is stopped. The target temperature during the engine operation is set at an activating temperature of the sensor element. The target temperature during the engine stop is set at a temperature lower than the activating temperature.

The prior art also discloses an example in which feedback control is executed based on an impedance of the sensor element. The impedance is used instead of the temperature of the sensor element because it has a relationship with the temperature of the sensor element. When the feedback control based on the impedance is executed, a target value of the impedance corresponding to the activating temperature is set during the engine operation. During the engine stop, the target value of the impedance corresponding to the lower temperatures is set.

SUMMARY

The impedance of the sensor element increases as the temperature of the sensor element becomes lower. Therefore, when the feedback control based on the impedance is executed, it is expected that the target value of the impedance during the engine stop is set to a value larger than the value that is set during the engine operation.

On the other hand, when detected values of the impedance becomes larger, a variation between the detected values become greater. Therefore, in order to suppress this variation, it is required to set the target value of the impedance during the engine stop to a relatively small value. That is, there is an upper restriction in the target value of the impedance that is able to set during the engine stop. Therefore, when the feedback control based on the impedance is executed, it is difficult to reduce power consumed by heating the sensor element during the engine stop.

One object of the present disclosure is to provide a technique capable of reducing the power consumed in accompany with a heating the sensor element by a heater during the engine stop.

A first aspect is a control system of an air-fuel ratio sensor that detects exhaust air-fuel ratio of an internal combustion engine.

The control system comprises a sensor element, a heater, and a control device. The sensor element includes a pair of electrodes. The heater heats a sensor element. The control device is configured to detect the exhaust air-fuel ratio by applying between the electrodes a voltage for detection.

The control device is configured to selectively execute first and second energization controls for controlling an energization amount to the heater. The first energization control is PWM control to keep the temperature of the sensor element within an active temperature region, and the energization amount is controlled with closed loop control such that an impedance of the sensor element matches a target value. The second energization control is PWM control in which the energization amount is controlled with open loop control so as to keep the temperature of the sensor element within a preset temperature region that is lower than the active temperature region.

The control device is further configured to:
execute the second energization control if the internal combustion engine is stopped; and
execute the first energization control if the internal combustion engine is not stopped.

A second aspect further has the following feature in the first aspect.

The control device includes a pulse input circuit.
The pulse input circuit is configured to input a pulse voltage to the voltage for detection to fluctuate the voltage for detection.

The control device is further configured to:
if the internal combustion engine is not stopped, permit input of the pulse voltage; and
if the internal combustion engine is stopped, prohibit the input of the pulse voltage.

A third aspect further has the following features in the first aspect.

The air-fuel ratio sensor is a limiting current type sensor.
The control device is further configured to:
if the internal combustion engine is not stopped, permit an execution of voltage variable control in which the voltage for detection is changed; and
if the internal combustion engine is stopped, prohibit the execution of the voltage variable control and also apply between the electrodes a preset constant voltage.

According to the first aspect, the first and second energization controls are selectively executed based on an operating state of the internal combustion engine. Specifically, if the internal combustion engine is stopped, the execution of the second energization control is selected. If the internal combustion engine is not stopped, the execution of the first energization control is selected.

Here, the first energization control is PWM control to keep the temperature of the sensor element within an active temperature region, and the energization amount is controlled with closed loop control such that an impedance of the sensor element matches a target value. On the other hand, second energization control is PWM control in which the energization amount is controlled with open loop control so as to keep the temperature of the sensor element within a preset temperature region that is lower than the active temperature region. Therefore, during the operation of the internal combustion engine, it is possible to keep the temperature of the sensor element within the active temperature region temperature by the execution of the first energization control. On the other hand, during the internal combustion engine is stopped, it is possible to keep the temperature of the sensor element within the preset temperature region by the execution of the second energization control.

The second energization control is a simpler control than the first energization control. Therefore, if the execution of the second energization control is selected during the internal combustion engine is stopped, it is possible to reduce the power consumed in accompany with the heating the sensor element by the heater during the engine stop.

As to the second aspect, the impedance of the sensor element is calculated by using a voltage change and current variation when the pulse voltage is applied to the sensor element. That is, the pulse voltage is inputted in order to detect the impedance of the sensor element and continue the execution of the first energization control. However, if the pulse voltage is inputted while the temperature of the sensor element is low, charges tend to accumulate inside the sensor element. Therefore, if the pulse voltage is inputted whereas there is a request for the operation stop, the charges become noises of the voltage change and the current variation. Then, stability of the first energization control after the re-start of the internal combustion engine is reduced.

In this regard, according to the second aspect, the input of the pulse voltage from the pulse input circuit is permitted or prohibited depending on an operating status of the internal combustion engine. Specifically, when the internal combustion engine is not stopped, the input of the pulse voltage is permitted. On the other hand, when the internal combustion engine is stopped, the input of the pulse voltage is prohibited. Therefore, in the former case, it is possible to continue the execution of the first energization control. In the latter case, it is possible to avoid an occurrence of a degradation of the sensor element or a failure due to the input of the pulse voltage.

Regarding the third aspect, a reason why the voltage variable control is executed in the air-fuel ratio sensor of the limiting current type is to specify a limiting current area that changes depending on the air-fuel ratio. However, when the temperature of the sensor element is low, the current does not easily flow through the sensor element. If the voltage variable control is executed under such a circumstance, the sensor element may be degraded.

In this regard, according to the third aspect, the execution of the voltage variable control is permitted or prohibited depending on the operating status of the internal combustion engine. Specifically, if the internal combustion engine is not stopped, the execution of the voltage variable control is permitted. On the other hand, if the internal combustion engine is stopped, the execution of the voltage variable control is prohibited. Therefore, in the former case, it is possible to execute the voltage variable control thereby the limiting current area is specified and also the exhaust air-fuel ratio is detected. In the latter case, it is possible to avoid an occurrence of a degradation or a failure of the sensor element caused by the execution of the voltage variable control.

With respect to the third aspect, if the application of the voltage between the electrodes of the sensor element is stopped during the internal combustion engine is stopped, an output of the air-fuel ratio sensor at the re-start of the internal combustion engine may become unstable. In this respect, according to the third aspect, if the internal combustion engine is stopped, the preset constant voltage is applied between the electrode voltages. That is, according to the third aspect, a constant voltage is applied between the electrodes during the execution of the voltage variable control is prohibited. Therefore, it is also possible to avoid the output of the air-fuel ratio sensor being unstable at the re-start of the internal combustion engine.

DESCRIPTION OF EMBODIMENT

Figure 1:
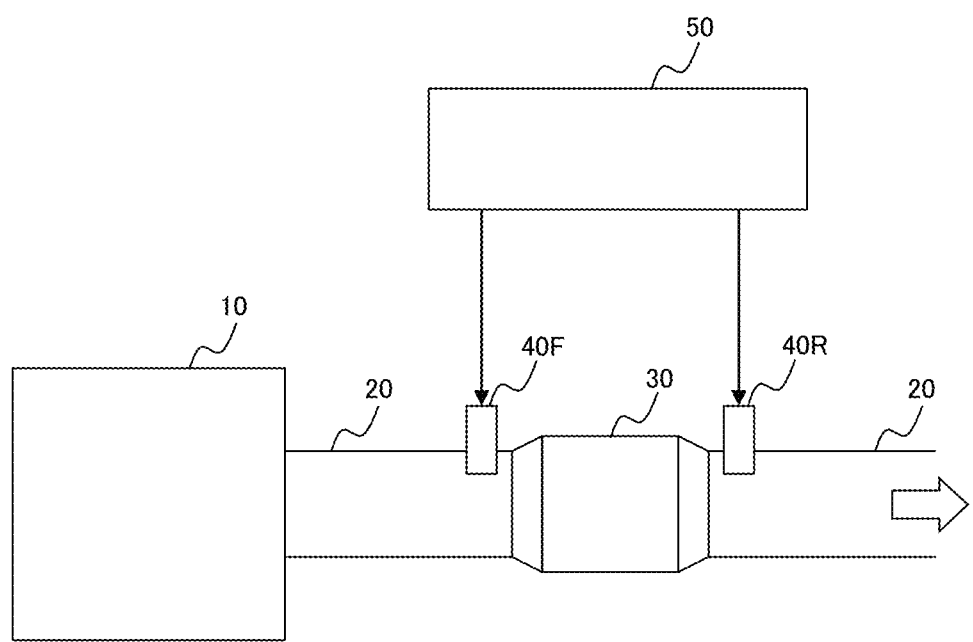
FIG. 1 is a diagram showing an application example of a control system of an air-fuel ratio sensor.

Hereinafter, an embodiment of the present disclosure will be described referring to the drawings. It should be noted that the same signs are attached to the same elements in the respective drawings, and duplicate descriptions are omitted. Further, the present disclosure is not limited by the following embodiment.

1. Control System of Air-Fuel Ratio Sensor 1-1. Application Example of Control System FIG. 1 is a diagram showing an application example of a control system of an air-fuel ratio sensor according to the embodiment. In FIG. 1, an exhaust system of an engine 10 is depicted. The exhaust system is mounted on a vehicle. The vehicle in which the exhaust system is mounted includes a vehicle powered by the engine 10 and an electronic vehicle powered by a motor (not shown), and a hybrid vehicle having the engine 10 and the motor. The motor is driven by a battery such as a secondary cell, a hydrogen cell, a metallic fuel cell, and an alcohol fuel cell.

The exhaust system shown in FIG. 1 comprises a catalyst unit 30 in a middle of an exhaust pipe 20. The catalyst unit 30 is constructed in a honeycomb shape, for example, and has a plurality of inner paths formed in a flow direction of the exhaust. A three-way catalyst is carried on a partition wall that partitions the inner paths. The three-way catalyst purifies noxious components (e.g., HC, CO and NOx) in the exhaust when an air-fuel ratio of the exhaust flowing into it is close to a theoretical air-fuel ratio (e.g., 14.7).

An air-fuel ratio sensor 40F is provided an upstream of the catalyst unit 30. The air-fuel ratio sensor 40F outputs a signal corresponding to the air-fuel ratio of the exhaust flowing into the catalyst unit 30. An air-fuel ratio sensor 40R is also provided a downstream of the catalyst unit 30. The air-fuel ratio sensor 40R outputs a signal corresponding to the air-fuel ratio of the exhaust passing through the catalyst unit 30. The configuration of the air-fuel ratio sensor 40F may be the same as or different from that of the air-fuel ratio sensor 40R. Hereinafter, these sensors are generically referred to as an "air-fuel ratio sensor 40" unless the air-fuel ratio sensors 40F and 40R are distinguished. Configuration examples of the air-fuel ratio sensor 40 will be described later.

The exhaust systems shown in FIG. 1 further comprise a control device 50. The control device 50 uses the output of the air-fuel ratio sensor 40 to executed air-fuel ratio feedback control. The air-fuel ratio feedback control includes, for example, main feedback control based on exhaust air-fuel ratio calculated by using the output of the air-fuel ratio sensor 40F, and sub feedback control based on the exhaust air-fuel ratio calculated by using the output of the air-fuel ratio sensor 40R.

In the main feedback control, a main feedback value is calculated based on a deviation between the theoretical air-fuel ratio and the exhaust air-fuel ratio calculated by using the output of the air-fuel ratio sensor 40F. In the sub feedback control, a sub feedback value is calculated based on the deviation between the exhaust air-fuel ratio calculated by using the output of the air-fuel ratio sensor 40R and a target air-fuel ratio corresponding to an optimal purification point of the three-way catalyst. The main and sub-feedback values are used to calculate a fuel injection amount in the engine 10.

The control device 50 executes control (hereinafter also referred to as "first energization control") to keep temperature of a sensor element of the air-fuel ratio sensor 40 within an active temperature region. The control device 50 also executes control (hereinafter also referred to as "second energization control") to keep the temperature of the sensor element within a preset temperature region. The active temperature region is, for example, 600 to 700° C. The preset temperature region is in a region lower than the active temperature region. For example, the present temperature is 300 to 400° C. A configuration example of the control device 50 to execute these controls and detailed description of these controls are given below.

1-2. Configuration Example of Control System

Figure 2:
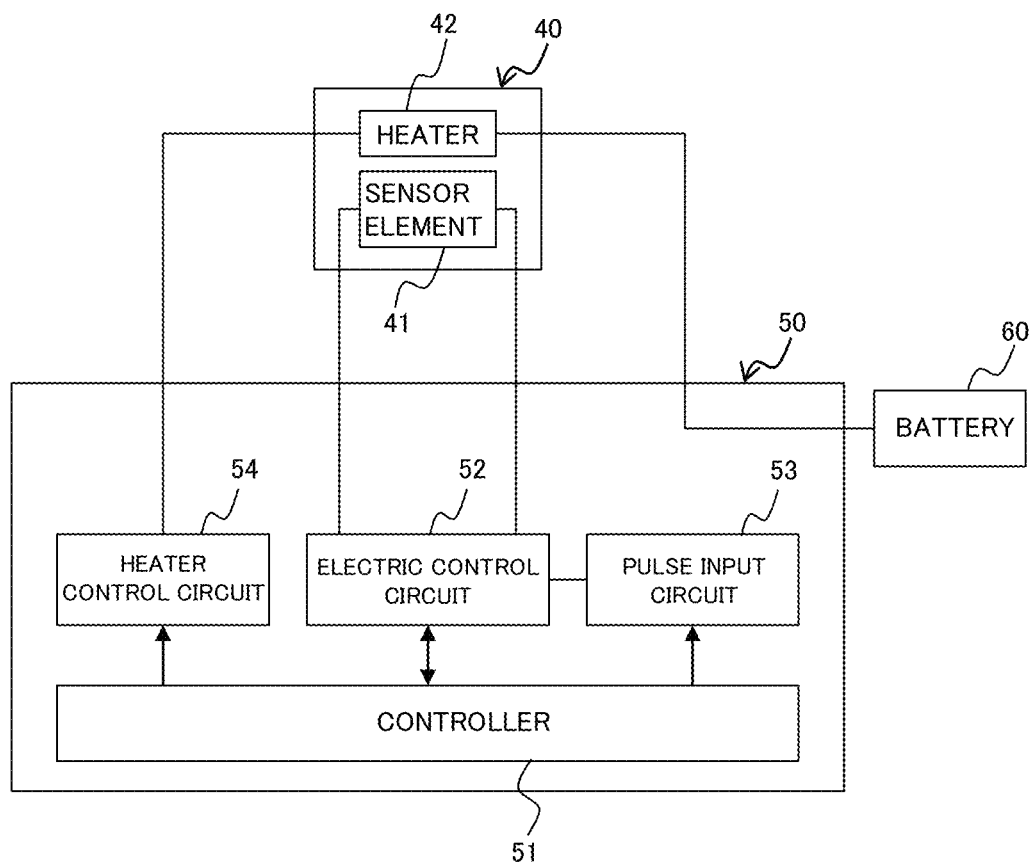
FIG. 2 is a diagram showing a configuration example of the control system of the air-fuel ratio sensor.

FIG. 2 is a diagram showing a configuration example of the control system according to the embodiment. As shown in FIG. 2, the control system according to the embodiment includes the air-fuel ratio sensor 40, the control device 50, and a battery 60.

Figure 3:
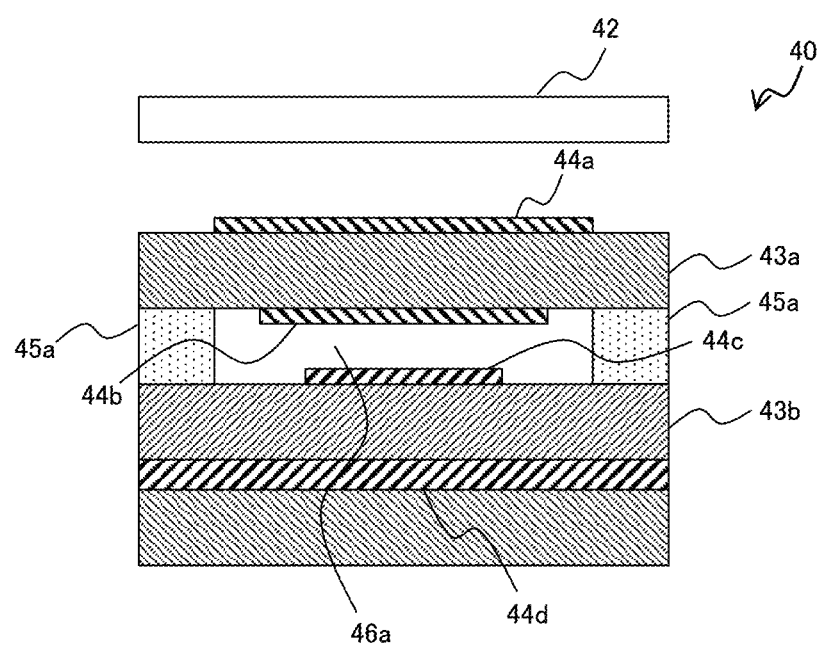
FIG. 3 is a diagram showing a configuration example of a two-cell type air-fuel ratio sensor.
Figure 4:
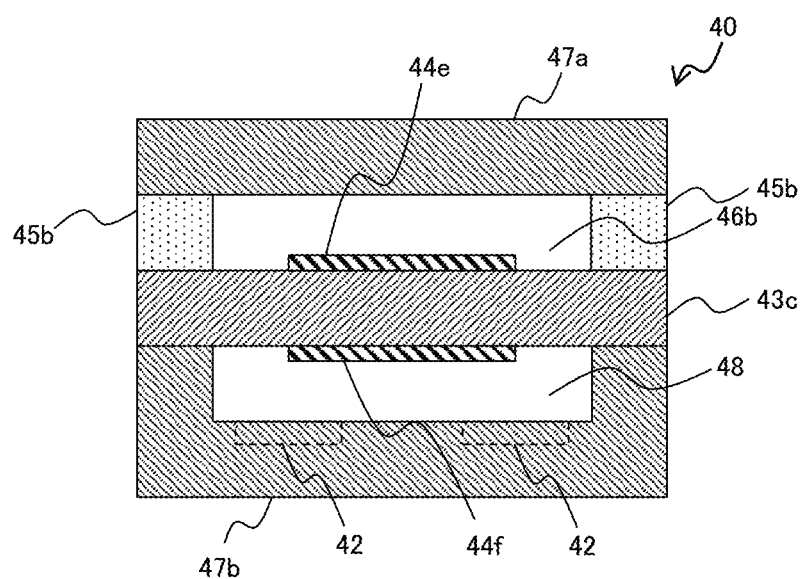
FIG. 4 is a diagram showing a configuration example of a limiting current type air-fuel ratio sensor.

The air-fuel ratio sensor 40 includes a sensor element 41 and a heater 42. FIGS. 3 and 4 are diagrams showing a configuration example of the air-fuel ratio sensor 40. FIG. 3 shows a configuration example of the air-fuel ratio sensor (so-called a two-cell type air-fuel ratio sensor) in which the air-fuel ratio is continuously measured from a lean region to a rich region. FIG. 4 shows a configuration example of the air-fuel ratio sensor (so-called a limiting current type air-fuel ratio sensor) for measuring the air-fuel ratio by using a limiting current.

The air-fuel ratio sensor 40 shown in FIG. 3 includes a heater 42, solid electrolyte layers 43a and 43b, electrodes 44a through 44d, and a diffusion layer 45a. The solid electrolyte layer 43a, the electrode 44a and 44b constitute a pump cell. The solid electrolyte layer 43b, electrode 44c and 44d constitute an electromotive force cell. In the example shown in FIG. 3, the sensor element 41 is consisted of the pump cell and the electromotive force cell. A space surrounded by the pump cell, the electromotive force cell and the diffusion layer 45a forms a measurement chamber 46a.

The measurement chamber 46a is connected to exhaust atmosphere via the diffusion layer 45a.

The air-fuel ratio sensor 40 shown in FIG. 4 includes a solid electrolyte layer 43c, electrodes 44e and 44f, a diffusion layer 45b, and insulation layers 47a and 47b. In the example shown in FIG. 4, the sensor element 41 is consisted of the solid electrolyte layer 43c and the electrodes 44e and 44f. A space surrounded by the solid electrolyte layer 43c, the diffusion layer 45b and the insulation layer 47a forms a measurement chamber 46b. The measurement chamber 46b is connected to exhaust atmosphere via the diffusion layer 45b. The space surrounded by the solid electrolyte layer 43c and the insulation layer 47b forms a reference oxygen chamber 48. Air is introduced into the reference oxygen chamber 48.

The principles to detect the air-fuel ratio in the two types of the air-fuel ratio sensors 40 shown in FIGS. 3 and 4 are basically the same. The detecting principles will be described using FIG. 4 as a typical example. Consider a case where a voltage VT is applied such that the electrode 44e is positive and the electrode 44f is negative. Under such a circumstance, when the air-fuel ratio of the exhaust in the measurement chamber 46b is lean, oxygen in this exhaust becomes oxygen ions on the electrode 44e. This oxygen ion passes through the solid electrolyte layer 43c and moves to the electrode 44f and becomes oxygen on this electrode and is discharged into the reference oxygen chamber 48. On the other hand, when the air-fuel ratio of the exhaust in the measurement chamber 46b is rich, the oxygen in air in the reference oxygen chamber 48 becomes oxygen ions on the electrode 44f. This oxygen ion passes through the solid electrolyte layer 43c and moves to the electrode 44e and becomes oxygen on this electrode and is discharged into the measurement chamber 46b. A pump current is generated in accompany with the movement of the oxygen-ions. The air-fuel ratio of the exhaust is measured based on this pump current. Note that the voltage VT applied between the electrodes (i.e., the electrodes 44e and 440 of the sensor element 41 corresponds to a "voltage for detection" in the present application.

Return to FIG. 2 and continue explaining the configuration example of the control system. The control device 50 includes a controller 51, an electric control circuit 52, a pulse input circuit 53, and a heater control circuit 54.

The controller 51 is an apparatus to execute engine control including air-fuel ratio feedback control. The controller 51 is typically a microcomputer including a processor, a memory device, and various ports for inputting and outputting signals. The processor executes various operations by executing computer programs. The memory device stores the computer programs, various databases, and so on. Various types of data are temporarily stored in the memory device.

Various processing executed by the processor include air-fuel ratio feedback control processing. The various processing also include control of voltage VT applied between the electrodes of the sensor element 41 (i.e., the voltage for detection). Various processing further include first and second energization control processing. The first and second energization control processing will be described later.

The electric control circuit 52 is electrically connected to the sensor element 41. The electric control circuit 52 variable controls the voltage VT applied between the electrodes of the sensor element 41 based on an instruction for control from the controller 51. The electric control circuit 52 also transmits a detection signal from the sensor element 41 to the controller 51. The detection signal includes a signal corresponding to the current IT that flow between the electrodes of the sensor element 41.

The pulse input circuit 53 applies a pulse voltage to the sensor element 41 through the electric control circuit 52. The pulse input circuit 53 generates the pulse voltage based on data of a pulse waveform included in an input instruction from the controller 51, and applies the pulse waveform to the sensor element 41. The pulse voltage is applied temporarily. A duration of the application of the pulse voltage is suitably set between several millisecond and several hundred millisecond.

When the pulse voltage is applied to the sensor element 41, the voltage VT applied between the electrodes of the sensor element 41 by the electric control circuit 52 is temporarily varied, and the current IT flowing between these electrodes is also varied. Therefore, the detected signal transmitted from the electric control circuit 52 to the controller 51 while the pulse voltage is being applied includes a signal corresponding to a variation component caused by the application of the detected signal.

The heater control circuit 54 includes, for example, a transistor (not shown). A collector of the transistor is, for example, connected to one end of the heater 42. An emitter of the transistor is connected, for example, to a reference potential. A base of this transistor is connected, for example, to a PWM port of the controller 51. The other end of the heater 42 is connected to the battery 60 which provides power to the controller 51.

The first and second energization control are performed by PWM (Pulse Width Modulation) control based on energization amount (duty ratio) of the heaters 42 calculated by the controller 51. In the PWM control, an ON or OFF signal of the transistor is output from the PWM port of the controller 51, thereby controlling the current flowing between the collector and the emitter of the transistor, i.e., ON and OFF of the current flowing from the battery 60 to the heater 42. Note that the heater control circuit 54 may be configured using a FET.

2. First Feature of Embodiment 2-1. First Energization Control

The first energization control is PWM control in which the energization amount is controlled with closed loop control such that an impedance of the sensor element 41 (hereinafter, also referred to as an "element impedance") matches a target value. The first energization control utilizes a property that the element impedance increases as the temperature of the sensor element 41 (hereinafter, also referred to as an "element temperature") decreases. The first energization control is executed to keep the temperature within the active temperature region when the element temperature is within the active temperature region.

The element impedance is detected by using the detection signal described above. Specifically, if the air-fuel ratio sensor 40 is the two-cell type sensor, the element impedance is calculated based on a potential difference PD between the electrodes of the electromotive force cell (i.e., the electrode 44c and 44d) and the current ID that flows between these electrodes. If the air-fuel ratio sensor 40 is the limiting current type sensor, the element impedance is calculated based on the voltage VT applied between the electrodes of the sensor element 41 by the electric control circuit 52 and the current IT that flows between these electrodes.

2-2. Problems in First Energization Control

Figure 5:
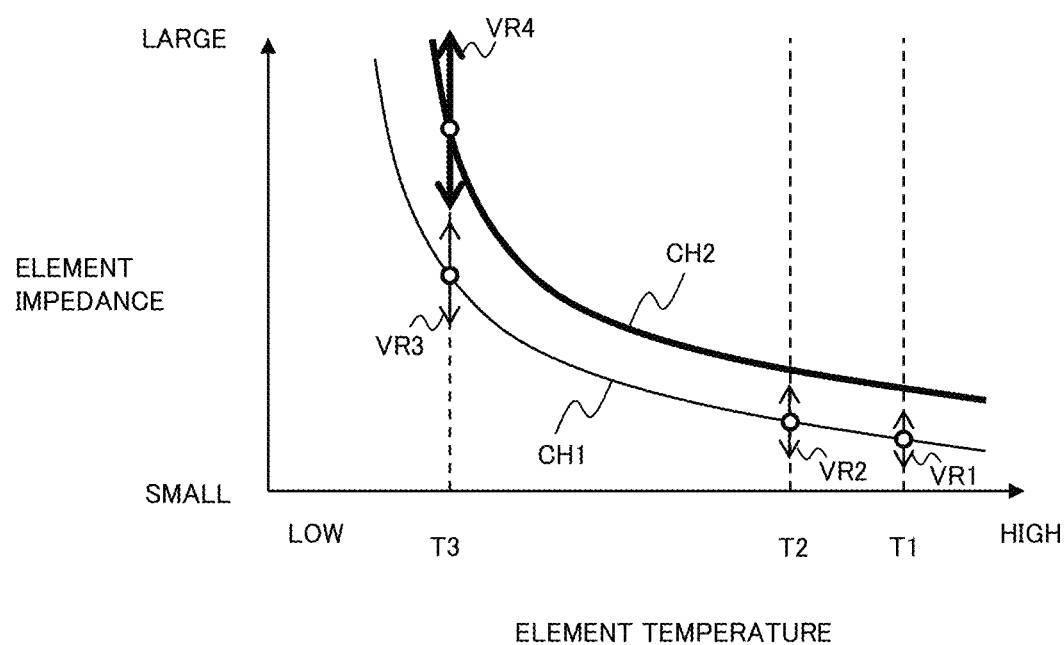
FIG. 5 is a diagram showing an example indicating a relationship between temperature and impedance of the sensor element.

Consider a case where the first energization control is executed not only while the element temperature is within the active temperature region, but also while the element temperature is in a temperature region lower than the active temperature region. In this case, however, there are the following problems due to a relationship between the element temperature and the element impedance. The problems will be explained by referring to FIG. 5. FIG. 5 is a diagram showing an example indicating a relationship between the element temperature and the element impedance.

A characteristic line CH1 shown in FIG. 5 is an example of the relationship in an initial state of the sensor element 41. A characteristic line CH2 is an example of the relationships in a degradation state of the sensor element 41. As can be seen from the characteristics lines CH1 and CH2, the element impedance increases as the element temperature decreases. As can be seen from comparing the characteristics lines CH1 and CH2, the element impedance increases as the deterioration of the sensor element 41 progresses.

Here, a variation VR occurs between element impedances calculated during the execution of the first energization control. Then, a magnitude of the variation VR is enlarged as the calculated values of the element impedances increase. Therefore, a variation VR2 at temperature T2 shown in FIG. 5 becomes higher than variation VR1 at temperature T1 (>T2). Further, variation VR3 at temperature T3 (>T2) becomes higher than the variation VR2. Still further, variation VR4 when the sensor element 41 is deteriorated at the temperature T3 becomes higher than the variation VR3.

If the variation VR increases, it becomes difficult to keep the element temperature in an appropriate temperature region. Therefore, there is a possibility that the element temperature is greatly lowered while the engine 10 is stopped. As a result, it takes time to warm up the sensor element 41 at a re-start of the engine 10. As described above, the relationship between the element temperature and the element impedance indicates that there is an upper restriction in the target value of the element impedance that can be set in the first energization control. Therefore, when the element temperature is within a temperature region lower than the active temperature region, it is difficult to reduce the power consumed by the execution of the first energization control.

Figure 6:
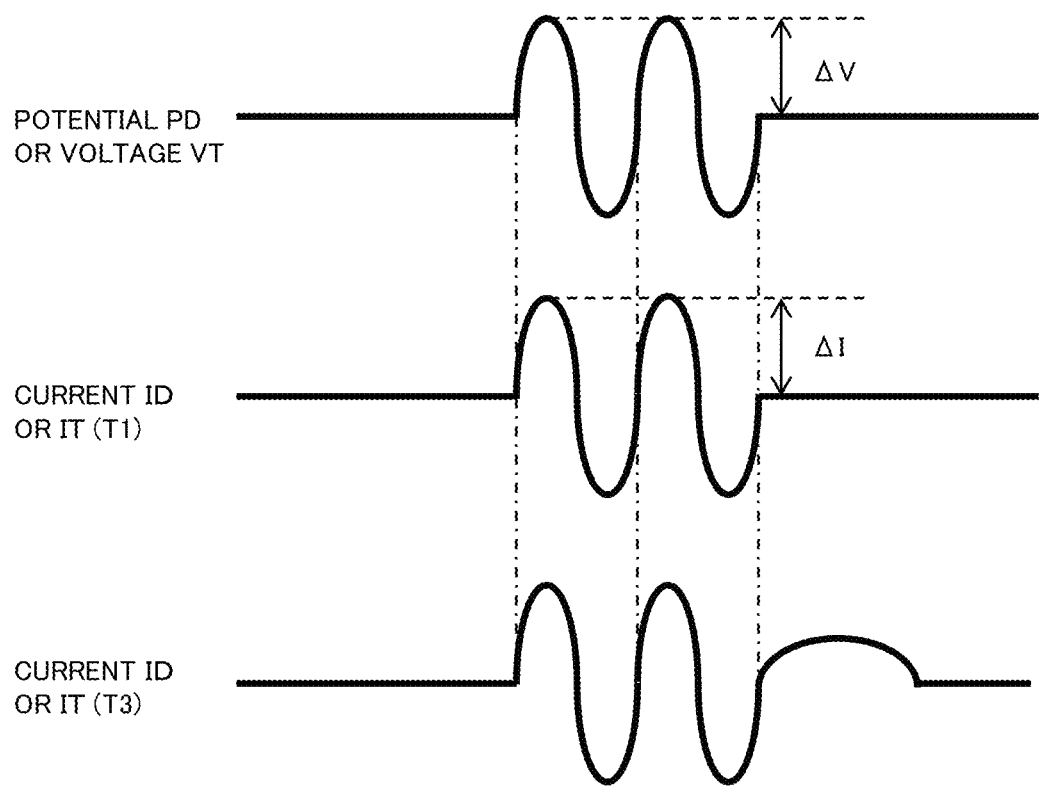
FIG. 6 is a diagram for explaining a problem when a pulse voltage is applied to the sensor element.

If the first energization control is continued when the element temperature is within the temperature region lower than the active temperature region, there are also the following problems. The problems will be explained by referring to FIG. 6. FIG. 6 is a diagram showing an example of the variation in the potential difference PD and the current ID (or the voltages VT and IT) when the pulse voltage is applied to the sensor element 41.

The element impedance is calculated by using the voltage change ΔV and a current variation ΔI when the pulse voltage is applied to the sensor element 41. That is, the application of the pulse voltage is performed in order to detect the element impedance and continue the execution of the first energization control. However, when the pulse voltage is applied while the temperature of the element is low, charges tend to accumulate in the sensor element 41. Therefore, when the pulse voltage is continuously applied when the element temperature is within the temperature region lower than the active temperature region (i.e., when the element temperature is at the temperature T3 shown in FIG. 5), the charges become noises of the detected signals. Then stability of the first energization control after the re-start of the engine 10 becomes lower.

Therefore, in the embodiment, when the engine 10 is stopped, the second energization control is executed instead of the execution of the first energization control. The second energization control is PWM control in which the energization amount to keep the element temperature within a preset temperature region is controlled with open loop control. The energization amount (the duty ratio) set in the second energization control is a value at which the warm-up of the sensor element 41 can be completed within a preset time (e.g., several seconds) after the re-start of the engine 10. This energization amount is also a value that can keep the element temperature within the preset temperature region during long idle stops (e.g., one hour) after the engine 10 has warmed up. In setting this energization amount, it is desirable to consider a variation width in an inner resistance of the heater 42. This energization amount is preferably corrected based on the voltage of the battery 60.

2-3. Energization Control Processing Example Executed by Control Device

Figure 7:
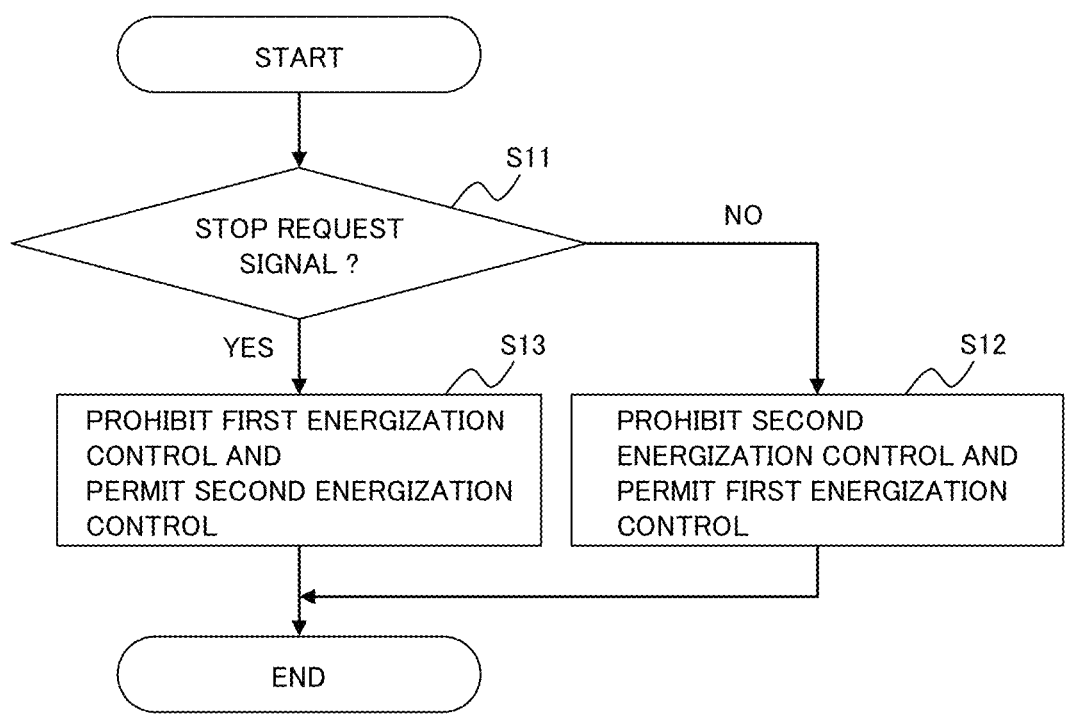
FIG. 7 is a flow chart for explaining a flow of energization control processing executed by the control device.

FIG. 7 is a flow chart for explaining a flow of the energization control processing executed by the control device 50 (the controller 51). The routine shown in FIG. 7 is repeatedly executed at a predetermined control cycle.

In the routine shown in FIG. 7, it is determined whether there is an input of a stop request signal (step S11). The stop request signal is input into the control device 50 if there is a request for operation stop to the engine 10. Whether or not there is the request for operation stop is comprehensively determined on the basis of, for example, driving speed of the vehicle, an amount of depression of an accelerator pedal by a driver, an operation mode currently selected, and the like.

If it is determined that the stop request signal is not inputted, it is determined that engine 10 is not stopped. In this case, the execution of the second energization control is prohibited and the execution of the first energization control is permitted (step S12). On the other hand, when it is determined that stop request signal is inputted, it is determined that the engine 10 is stopped. In this case, the execution of the first energization control is prohibited and the execution of the second energization control is permitted (step S13). As described above, according to the processing of the step S12 or S13, when the execution of one of the first and second energization controls is prohibited, the execution of the other is permitted. That is, the first and second energization controls are selectively executed.

In particular, according to the processing of the step S13, the execution of the first energization control is prohibited. Therefore, the application of the pulse voltage that is performed for the purpose of continuing the execution of the first energization control is also prohibited in accompany with the prohibition of the execution. In other words, according to the processing of the step S12 in which the execution of the first energization control is permitted, the application of the pulse voltage is also permitted. As described above, according to the processing of the steps S12 and S13, the application of the pulse voltage is permitted or prohibited based on the judgement result of the operating status of the engine 10.

3. Second Feature of Embodiment

3-1. Voltage Variable Control

Figure 8:
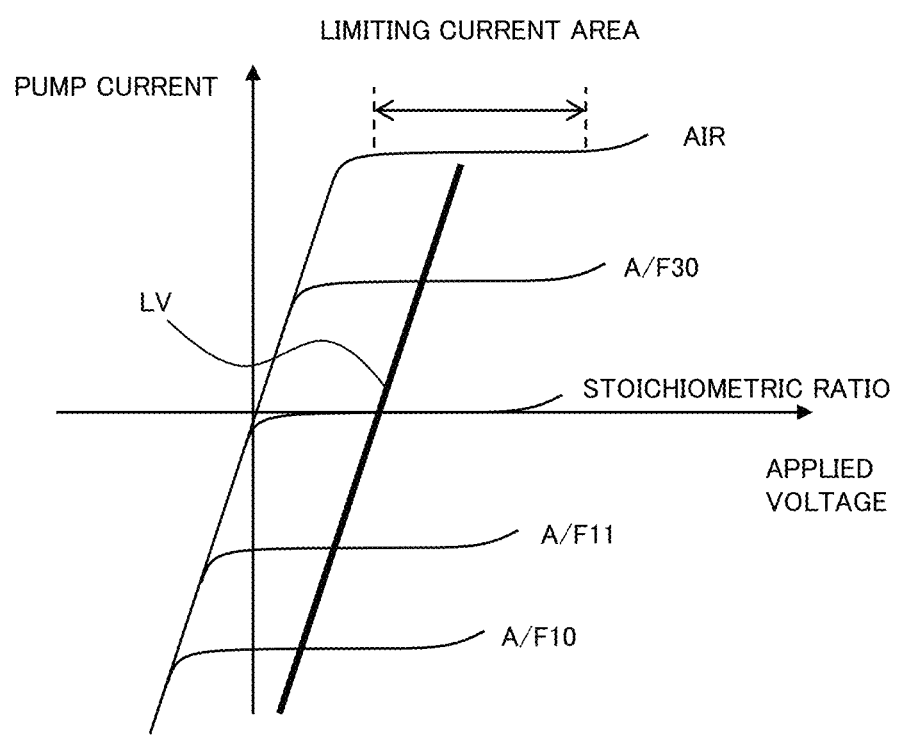
FIG. 8 is a diagram showing an example indicating a relationship between the air-fuel ratio and limiting current area.

The reason why the variable control of the voltage VT is executed when the air-fuel ratio sensor 40 is the limiting current type sensor will be explained based on the relationship between the air-fuel ratio and the limiting current area. FIG. 8 is a diagram showing an example indicating a relationship between the air-fuel ratio (A/F) and the limiting current area. As shown in FIG. 8, the limiting current area where a pump current shows a nearly constant value changes with each of the air-fuel ratio. Therefore, in the variable control, in order to specify the limiting current area, the voltage VT is continuously changed along the voltage for detection line LV shown in FIG. 8. Since the relationship between the pump current and the air-fuel ratio at the limiting current area is known, the exhaust air-fuel ratio is detected by using the pump current detected during the change of the voltage VT.

3-2. Problems in Voltage Variable Control

As can be seen from the fact that the element impedance increases as the element temperature decreases, the lower the element temperature, the more difficult it is for the current to flow through the sensor element 41. Therefore, during the engine 10 is stopped when the second energization control is executed, it is difficult for the current to flow through the sensor element 41 compared to when the first energization control is being executed. If the voltage variable control is executed in such a situation, the high voltage VT applied when the atmosphere of the measurement chamber 46b is close to air may cause the deterioration of the sensor element 41.

Therefore, in the embodiment, when the engine 10 is stopped, the execution of the voltage variable control is prohibited. However, if the application of the voltage is stopped between the electrodes of the sensor element 41 (i.e., the electrodes 44e and 440, there is a possibility that the output of the air-fuel ratio sensor 40 at the re-start of the engine 10 becomes unstable. Therefore, in the embodiment, a reference voltage (e.g., 0.3 to 0.5V) for detecting the air-fuel ratio in the vicinity of the stoichiometric ratio is applied between the electrodes of the sensor element 41 during the execution of the voltage variable control is prohibited.

In another example, a voltage VT is applied between the electrodes of the sensor element 41, the voltage VT corresponding to exhaust air-fuel ratio detected just prior to request for operation stop on engine 10. In yet another embodiment, a voltage VT corresponding to the exhaust air-fuel ratio detected just before the request for operation stop for the engine 10 is applied between the electrodes of the sensor element 41.

3-3. Control Processing Example by Control Device

Figure 9:
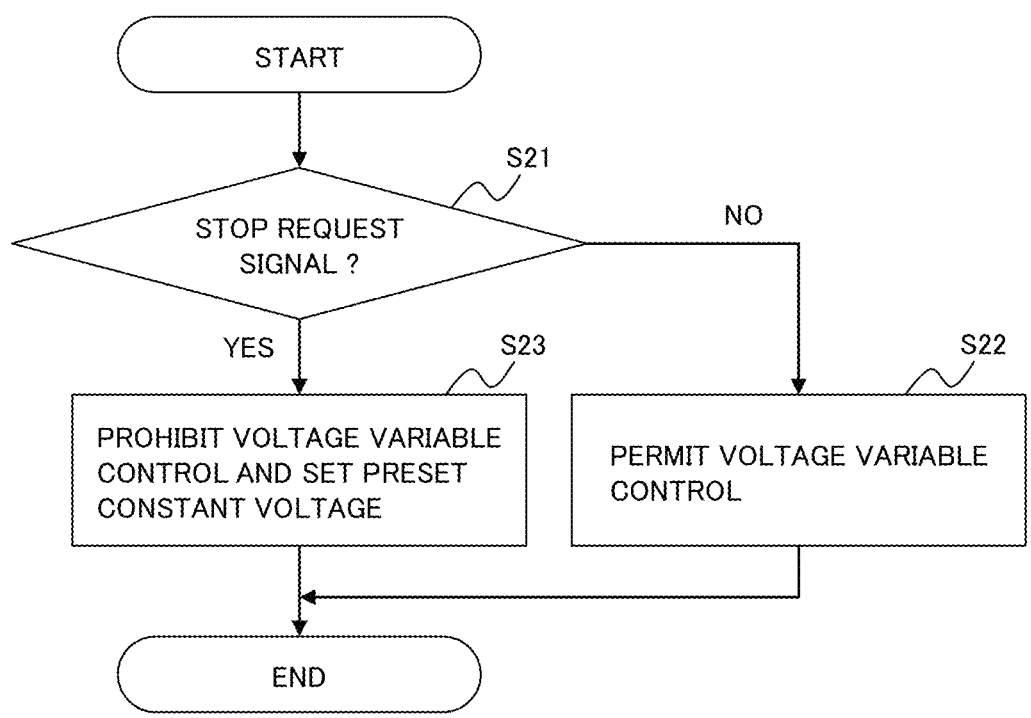
FIG. 9 is a flowchart explaining a flow of processing related to the voltage variable control executed by the control device.

FIG. 9 is a flow chart for explaining a flow of processing related to the voltage variable control executed by the control device 50 (the controller 51). The routine shown in FIG. 9 is repeatedly executed at a predetermined control cycle.

In the routine shown in FIG. 9, it is determined whether there is an input of the stop request signal (step S21). The content of step S21 is the same as that of the step S11 shown in FIG. 7.

If it is determined that the stop request signal is not inputted, it is determined that the engine 10 is not stopped. In this case, the execution of the voltage variable control is permitted (step S22). On the other hand, when it is determined that the stop request signal is inputted, it is determined that the engine 10 is stopped. In this case, the execution of the voltage variable control is prohibited and a preset constant voltage is set (step S23). As described above, according to the processing of the step S22 or S23, the execution of the voltage variable control is permitted or prohibited according to the input of the stop request signal. In addition, according to the processing of the step S23, the voltage VT (constant value) is set during the execution of the voltage variable control is prohibited.

4. Effect

According to the first feature of the embodiment described above, when the stop request signal is inputted, the execution of the first energization control is prohibited. Therefore, it is possible to avoid the problems (e.g., such as the degradation or the failure of the sensor element) that may occur when the first energization control is executed at all times. According to the first feature, the execution of the second energization control is permitted when the stop request signal is inputted. The second energization control is simpler control than the first energization control, and is realized by a configuration for executing the first energization control. Therefore, it is possible to reduce the power consumed by heating the sensor element 41 when the stop request signal is inputted at low cost.

According to the second feature of the embodiment, the execution of the voltage variable control is prohibited when the stop request signal is inputted. Therefore, it is possible to avoid the problems assumed when the voltage variable control is executed at all times. According to the second feature, the voltage VT (constant value) is set during the execution of the voltage variable control is prohibited. Therefore, it is possible to detect the exhaust air-fuel ratio during the execution of the voltage variable control is prohibited. Therefore, it is also possible to avoid the output of the air-fuel ratio sensor 40 being unstable at the re-start of the engine 10.

What is claimed is:

1. A control system of an air-fuel ratio sensor configured to detect exhaust air-fuel ratio of an internal combustion engine, comprising:
   a sensor element including a pair of electrodes;
   a heater configured to heat the sensor element; and
   a control device configured to detect the exhaust air-fuel ratio by applying between the electrodes a voltage for detection,
   wherein the control device is configured to selectively execute first and second energization controls for controlling an energization amount to the heater,
      wherein the first energization control is PWM control to keep the temperature of the sensor element within an active temperature region, and the energization amount is controlled with closed loop control such that an impedance of the sensor element matches a target value,
      wherein the second energization control is PWM control in which the energization amount is controlled with open loop control so as to keep the temperature of the sensor element within a preset temperature region that is lower than the active temperature region,
   wherein the control device is further configured to:
   execute the second energization control if the internal combustion engine is stopped; and
   execute the first energization control if the internal combustion engine is not stopped.

2. The control system according to claim 1,
wherein the control device includes a pulse input circuit configured to input a pulse voltage to the voltage for detection to fluctuate the voltage for detection,
wherein the control device is further configured to:
if the internal combustion engine is not stopped, permit input of the pulse voltage; and
if the internal combustion engine is stopped, prohibit the input of the pulse voltage.

3. The control system according to claim 1,
wherein the air-fuel ratio sensor is a limiting current type sensor,
wherein the control device is further configured to:
if the internal combustion engine is not stopped, permit an execution of voltage variable control in which the voltage for detection is changed; and
if the internal combustion engine is stopped, prohibit the execution of the voltage variable control and also apply between the electrodes a preset constant voltage.

* * * * *